INVENTORS.
DALE E. BUFKIN
WILLARD G. MURPHY
RONALD E. YOUNT
BY Robert W. Lahtinen
ATTORNEY

United States Patent Office 3,425,336
Patented Feb. 4, 1969

3,425,336
COFFEE MAKER
Dale E. Bufkin, Willard G. Murphy, and Ronald E. Yount, Macon, Mo., assignors to McGraw-Edison Company, Elgin, Ill., a corporation of Delaware
Filed May 5, 1967, Ser. No. 636,366
U.S. Cl. 99—281        6 Claims
Int. Cl. A47j *31/35;* F27d *11/02;* H05b *3/68*

ABSTRACT OF THE DISCLOSURE

A manually operated structure for regulating the brewing time by varying the effective heat transfer from the wall of a vessel to a fixed value heat sensitive element of a controlling switch member.

---

This invention relates to beverage brewing devices and more particularly to a manually operated device for varying the brewing time in an electric coffee maker.

In an electric coffee percolator the infusion cycle is normally determined by terminating the brewing cycle when the contents of the vessel have attained a predetermined temperature. The strength of the brew is commonly varied in such units by a variation in the terminal temperature attained by the vessel when the principal heating element is switched off. By increasing this temperature the brewing time is lengthened the final brew is made stronger. This result can be achieved by using a variable temperature thermostat. The same result can be achieved using a fixed value thermostatic switch by providing a method of varying the effective temperature sensed. This has often been accomplished by heat anticipation wherein heat is variably supplied to the thermostatic element to cause it to actuate the thermostatic switch and interrupt the cycle before the vessel contents have actually attained the temperature at which the thermostatic switch would be activated thereby.

In the device of the present invention the conductive heat path from the vessel wall to the temperature sensing thermostat element is varied in effectiveness to alter the temperature of the vessel contents at the time of cycle termination to effectively vary the cycle length and the strength of the resulting brew.

It is an object of this invention to provide an improved automatic coffee percolator control for varying the strength of brew utilizing a fixed value thermostat.

It is a further object of this invention to provide a coffee maker control which is adjustable to vary the cycle, simple in structure and reliable in operation.

These and other objects and advantages of this invention will become apparent from the following description when taken in connection with the accompanying drawings, wherein.

Figure 1:
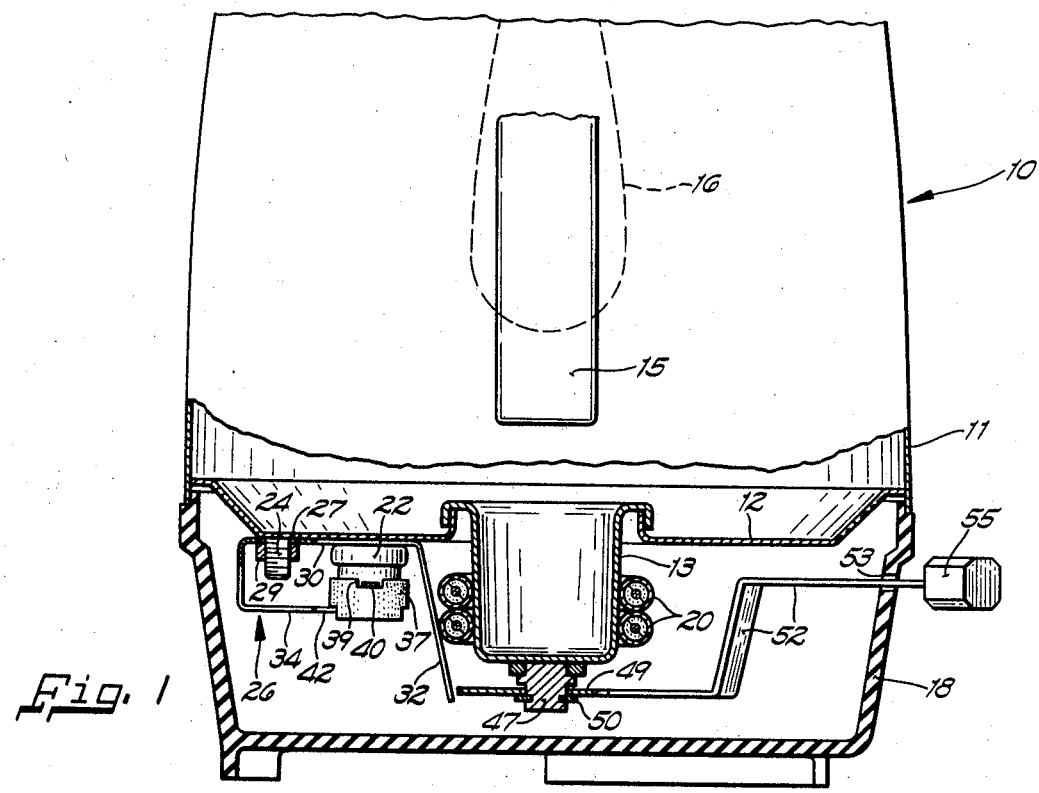
FIG. 1 is a partial side elevation, partly in section of a coffee maker showing the timer mechanism of this invention.

Referring to the drawings the coffee maker includes a liquid vessel 10 with side wall 11 and a bottom wall 12. The bottom wall 12 as illustrated includes a central well 13 which is brazed to the remainder of the bottom wall, but which may also be formed as an integral portion of a one piece bottom wall. The coffee maker further includes a handle 15, a spout 16 shown in phantom view and certain portions which have not been illustrated including a percolator tube or vapor lift pump with the associated valve which would be received in the well 13, a coffee basket and a cover for the vessel. The vessel 10 is supported upon a plastic base 18 which provides heat insulation and an enclosure beneath the vessel.

Within the enclosure a metal sheath heating element 20 is helically disposed about the exterior peripheral surface of the well 13 and is commonly brazed thereto to afford an intimate heat transfer connection between the well and the heating element. The supply of electrical energy to the heating element is controlled by a fixed value thermostatic switch 22 which is electrically connected in series with the heating element 20 and the source of electric current.

Welded to the bottom surface of the bottom wall 12 and depending therefrom is a threaded stud 24. A thermostat retaining bracket 26 formed of a resilient strip material has an aperture 27 through which the stud 24 is received. An aperture 28 in the bracket generally aligned with the aperture 27 affords access to the stud and the securing nut 29 in the assembled condition.

Figure 3:
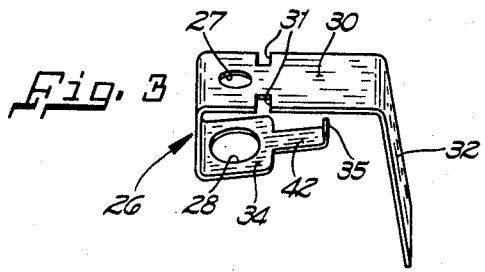
FIG. 3 is an isometric view of the switch mounting bracket.

As seen in FIG. 3 the bracket 26 has an intermediate portion 30 with opposed notches 31 extending from the margins, a terminal end 32 angularly disposed with respect to the intermediate portion 30 and an opposite terminal end formed with a leg 34 overlying the intermediate portion 30 and a distal end portion 35 turned toward the intermediate portion and at right angles to the leg 34. In the assembled condition the thermal switch 22 is retained between the bracket intermediate portion 30 and the leg 34 with the heat sensing surface confronting the lower surface of the bracket intermediate portion 30. The lower portion of the thermostatic switch 22 rests against the upper surface of a ceramic insulator 37 with relative radial movement therebetween restricted by a ridge 38 which is interrupted at diametrically opposite sides by notches 39 through which the switch electrical terminals 40 (one of which is shown) respectively extend. The reduced width end portion 42 of the bracket 26 is received in a diametrical slot 44 in the lower surface of the ceramic insulator 37 with the bracket turned distal end 35 received in a central recess 45 formed in the insulator.

A stud member 47 is welded to the bottom surface of the well 13 and projects axially downwardly therefrom. An apertured cam plate 49 is journaled about the stud with a spring washer 50 recieved in an annular groove retaining it in position. Formed as an integral part of the cam plate 49 is an operating lever 52 which projects through a slotted opening 53 in the wall of the plastic base 18 and carries an operating handle 55 on its distal end.

In operation the temperature of the contents of the vessel at the time of termination of the brewing cycle determines the length of time during which water will be delivered to the coffee basket or the amount of water so delivered and accordingly the strength of the brew. Utilizing the fixed value thermostatic switch 22 of the present invention the terminal temperature of the vessel contents is determined by the directness or effectiveness of the heat transfer from the vessel bottom or other heat source to the thermostatic switch to determine the length of the cycle.

When the lever 52 is pivoted to the position shown in FIG. 1 the intermediate portion 30 of the bracket 26 intimately engages the lower surface of the vessel bottom wall 12 to form a direct conductive path of heat transfer from the bottom wall through the bracket intermediate portion to the heat sensitive surface of the thermostatic switch 22. In addition the leg 32 of the bracket 26 engages the heating element 20 to provide another path of conductive heat transfer from an even hotter source. Under these circumstances the brewing cycle will be terminated almost immediately upon the contents of the vessel having reached the operating temperature to which the thermostatic switch is calibrated and a weak brew is obtained.

Figure 2:
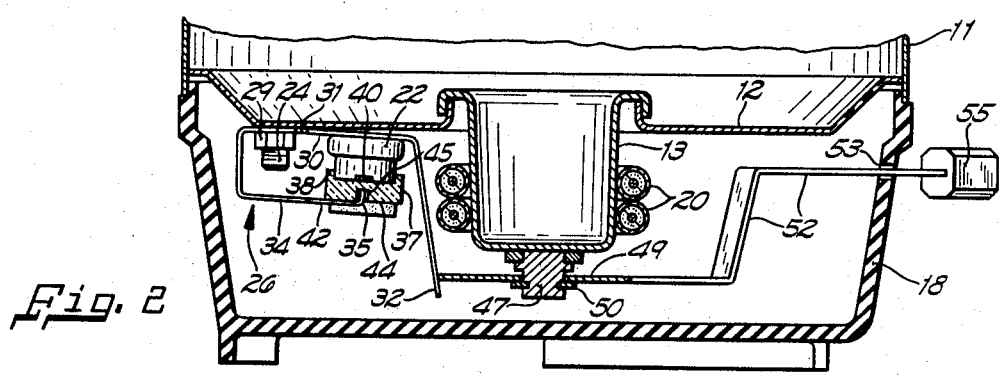
FIG. 2 is a partial side elevation similar to FIG. 1 with the manual control in a different position of adjustment.

In the condition shown in FIG. 2 the lever 52 and associated cam plate 49 is shown in the opposite extreme position of pivotal movement. In this position the cam plate 49 has engaged the end portion of the leg 32 of bracket 26 removing it from contact with the heating element and also bending the bracket intermediate portion 30 principally at the narrowed portion between notches 31 to move the bracket intermediate portion, confronted by the heat sensitive surface of the thermostatic switch 22, away from the vessel bottom wall creating an air space therebetween. The conductive path of heat transfer between the vessel bottom wall and the thermostatic switch is now lengthened and less direct and only moderately supplemented by the radiant or convective heat transfer from the relatively low temperature adjacent surfaces and consequently the heating of the thermostatic switch 22 to the calibrated temperature is delayed resulting in a higher vessel temperature at the termination of the cycle causing a longer duration of the brewing cycle and a stronger resulting brew. Pivotal positions of lever 52 intermediate the terminal positions illustrated in FIGS. 1 and 2 will progressively vary the effective heat conduction to the thermostatic switch 22 and result in a brewing time and strength of brew intermediate those attained at the terminal positions.

Although but one embodiment has been shown and described, it will be apparent that various changes and modifications may be made therein without departing from the spirit of the invention or from the scope of the appended claims.

What is claimed is:

1. A beverage brewing device comprising a pot formed with a bottom wall; an electric heating element mounted in heat delivering relationship to said bottom wall; a resilient heat conductive bracket having a mounting area secured to said device and having first and second leg portions, which in a minimum brewing strength position engage respectively, the bottom wall and the heating element; a temperature control switch having a heat sensitive surface; said switch being mounted on said bracket with said heat sensitive surface disposed in heat receiving relationship to said first leg portion; manually operable means engageable with said bracket for selectively moving the leg portions from the minimum brewing strength position to other positions variably spaced from the bottom wall and the heating element to provide for greater strength brewing of the brewing device; and means to prevent substantial heat transfer by conduction along the bracket from the mounting area to the first leg portion.

2. A beverage brewing device according to claim 1, wherein the resilient bracket is normally biased to the minimum brewing strength position and is moved by the manually operable means against the normal bias for greater strength brewing.

3. A beverage brewing device according to claim 1, wherein the bracket mounting area and the first leg portion are integral but are connected together only by a narrowed neck section to act as the means to prevent substantial heat transfer by conduction along the bracket.

4. A beverage brewing device according to claim 3, wherein the manually operable means is disposed adjacent and engages the second leg portion of the bracket.

5. A beverage brewing device according to claim 1, wherein the bracket further includes third and fourth leg portions connected to the bracket off the mounting area that mount said switch on said bracket, wherein threaded means normally hold the bracket to the device at the mounting area, and wherein the fourth leg portion has an opening which opposes the threaded means to provide tool access for actuation of the latter.

6. A beverage brewing device according to claim 5, wherein the resilient bracket is normally biased to the minimum brewing strength position.

References Cited

UNITED STATES PATENTS

| | | | |
|---|---|---|---|
| 2,007,596 | 7/1935 | Burke | 219—510 |
| 3,059,092 | 10/1962 | Olson | 219—441 |
| 3,147,369 | 9/1964 | Salton | 219—449 |
| 3,329,802 | 7/1967 | Vogt | 219—413 |

ROBERT W. JENKINS, *Primary Examiner.*

U.S. Cl. X.R.

219—442